United States Patent
Hoshina et al.

(10) Patent No.: US 9,705,155 B2
(45) Date of Patent: Jul. 11, 2017

(54) ELECTRODE FOR SOLID ELECTROLYTE SECONDARY BATTERY, SOLID ELECTROLYTE SECONDARY BATTERY, AND BATTERY PACK

(71) Applicant: KABUSHIKI KAISHA TOSHIBA, Minato-ku, Tokyo (JP)

(72) Inventors: Keigo Hoshina, Yokohama (JP); Hiroki Inagaki, Yokohama (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 32 days.

(21) Appl. No.: 14/211,743

(22) Filed: Mar. 14, 2014

(65) Prior Publication Data
US 2014/0199598 A1  Jul. 17, 2014

Related U.S. Application Data

(63) Continuation of application No. PCT/JP2012/056718, filed on Mar. 15, 2012.

(51) Int. Cl.
*H01M 4/48* (2010.01)
*H01M 10/0525* (2010.01)
(Continued)

(52) U.S. Cl.
CPC ......... *H01M 10/0525* (2013.01); *H01M 4/13* (2013.01); *H01M 4/62* (2013.01);
(Continued)

(58) Field of Classification Search
CPC ...... H01M 10/0525; H01M 4/13; H01M 4/62; H01M 10/0562
See application file for complete search history.

(56) References Cited

U.S. PATENT DOCUMENTS 7,303,838 B2   12/2007  Morita et al.
2006/0068287 A1   3/2006  Morita et al.
(Continued)

FOREIGN PATENT DOCUMENTS

JP   61-267264   11/1986
JP   09-139233   5/1997
(Continued)

OTHER PUBLICATIONS

IPRP dated Sep. 25, 2014 from PCT/JP2012/056718, 6 pages.
(Continued)

*Primary Examiner* — Helen O Conley
(74) *Attorney, Agent, or Firm* — Amin, Turocy & Watson LLP (57) ABSTRACT

According to one embodiment, a solid electrolyte secondary battery includes a positive electrode, a negative electrode, and a solid electrolyte layer, wherein at least one selected from the positive electrode and the negative electrode comprises active material particles, first solid electrolyte particles located the vicinity of a surface of the active material particles, and second solid electrolyte particles located a gap between the active material particles. A particle size ratio of a second solid electrolyte particle size D2 to a first solid electrolyte particle size D1 (D2/D1) satisfies the relation of 3<D2/D1<50, where D1 and D2 denote a particle size of the first and second solid electrolyte particles, respectively.

14 Claims, 3 Drawing Sheets

(51) Int. Cl.
  *H01M 4/13* (2010.01)
  *H01M 4/62* (2006.01)
  *H01M 10/0562* (2010.01)

(52) U.S. Cl.
  CPC ....... *H01M 10/0562* (2013.01); *Y02E 60/122* (2013.01); *Y02T 10/7011* (2013.01)

(56) References Cited

U.S. PATENT DOCUMENTS

| | | | |
|---|---|---|---|
| 2010/0075227 A1 | 3/2010 | Morita et al. | |
| 2011/0159360 A1 | 6/2011 | Hirota et al. | |
| 2011/0159361 A1 | 6/2011 | Minami et al. | |
| 2011/0263834 A1* | 10/2011 | Lees | C07K 1/16 530/399 |
| 2012/0237834 A1* | 9/2012 | Ogasa | H01M 10/0562 429/320 |
| 2012/0301778 A1* | 11/2012 | Trevey | H01M 4/131 429/178 |

FOREIGN PATENT DOCUMENTS

| | | | |
|---|---|---|---|
| JP | 10-162833 A | 6/1998 | |
| JP | 2000-173582 A | 6/2000 | |
| JP | 2011-181495 A | 9/2001 | |
| JP | 2002-109955 A | 4/2002 | |
| JP | 2004-119176 A | 4/2004 | |
| JP | 2006-260784 A | 9/2006 | |
| JP | 2009-181882 * | 8/2009 | ............ H01M 10/36 |
| JP | 2009-187911 | 8/2009 | |
| JP | 2009-211950 | 9/2009 | |
| JP | 2010-73539 A | 4/2010 | |
| JP | 2010-80426 A | 4/2010 | |
| JP | 2011-134623 A | 7/2011 | |
| JP | 2011-134651 A | 7/2011 | |
| JP | 2013-157084 | 8/2013 | |
| WO | 2011/078356 A1 | 6/2011 | |
| WO | 2012-026583 | 3/2012 | |
| WO | 2013/140590 A1 | 9/2013 | |

OTHER PUBLICATIONS

International Search Report (with English translation) dated Jun. 19, 2012 from corresponding PCT/JP2012/056718, 5 pages.

Written Opinion dated Jun. 19, 2012 from corresponding PCT/JP2012/056718, 4 pages.

Kuwabata, et al.; "Rechargeable Lithium Battery Cells Fabricated Using Poly(methyl methacrylate) Gel Electrolyte and Composite of V2O5 and Polypyrrole"; Journal of the Electrochemical Society, 149, (8); 2002, pp. A988-A994.

Japanese Office Action for Japanese Patent Application No. 2016-700237 mailed on Apr. 15, 2016.

Japanese Office Action for Japanese Patent Application No. 2016-700237 mailed on Aug. 26, 2016.

* cited by examiner

ELECTRODE FOR SOLID ELECTROLYTE SECONDARY BATTERY, SOLID ELECTROLYTE SECONDARY BATTERY, AND BATTERY PACK

CROSS REFERENCE TO RELATED APPLICATIONS

This application is a Continuation Application of PCT Application No. PCT/JP2012/056718, filed Mar. 15, 2012, the entire contents of which are incorporated herein by reference.

FIELD

Embodiments described herein relate generally to an electrode for a solid electrolyte secondary battery, a solid electrolyte secondary battery, and a battery pack.

BACKGROUND

It has been studied that a common lithium-ion secondary battery is applied to a vehicle-mounted power supply for hybrid automobiles, plug-in hybrid automobiles, electric vehicles and the like, and large-sized equipment such as a stationary power supply for storing power.

When the common lithium-ion secondary battery is applied to large-sized equipment, it is important to increase the battery in safety. The lithium-ion secondary battery is likely to leak a liquid and generate gas because it employs a non-aqueous electrolyte solution.

DETAILED DESCRIPTION

Hereinafter, an electrode for a solid electrolyte secondary battery, a solid electrolyte secondary battery, and a battery pack according to the embodiment will be described in detail.

In general, an electrode for a solid electrolyte secondary battery according to embodiment comprises active material particles, first solid electrolyte particles located the vicinity of a surface of the active material particles, and second solid electrolyte particles located a gap between the active material particles, wherein a particle size ratio of a second solid electrolyte particle size D2 to a first solid electrolyte particle size D1 (D2/D1) satisfies the relation of 3<D2/D1<50, where D1 denotes the particle size of the first solid electrolyte particles, and D2 denotes the particle size of the second solid electrolyte particles.

The electrode for the solid electrolyte secondary battery according to the embodiment is applied to at least one selected from a positive electrode and a negative electrode.

In the electrode for the solid electrolyte secondary battery according to the embodiment, the first solid electrolyte particles located the vicinity of a surface of the active material particles contribute to increase in reaction area, and the second solid electrolyte particles located a gap between the active material particles contribute to long-distance ion conductivity between the active material particles. By defining the particle size ratio of the second solid electrolyte particle size D2 of the second solid electrolyte particles to the first solid electrolyte particle size D1 of the first solid electrolyte particles (D2/D1) as 3<D2/D1<50, the function of the first and second solid electrolyte particles can be effectively exhibited. As a result, ion (such as lithium ion) conductivity of the electrode itself can be improved. In addition, when the electrode is applied to a solid electrolyte secondary battery comprising the solid electrolyte layer, the lithium ion conductivity can be increased between the electrode and the solid electrolyte layer.

Next, the solid electrolyte secondary battery according to the embodiment will now be described in detail.

In general, a solid electrolyte secondary battery according to embodiment comprises a positive electrode, a negative electrode, and a solid electrolyte layer, wherein at least one selected from the positive electrode and the negative electrode comprises active material particles, first solid electrolyte particles located the vicinity of a surface of the active material particles, and second solid electrolyte particles located a gap between the active material particles, and a particle size ratio of a second solid electrolyte particle size D2 to a first solid electrolyte particle size D1 (D2/D1) satisfies the relation of 3<D2/D1<50, where D1 denotes the first solid electrolyte particles and D2 denotes the second solid electrolyte particles.

The positive electrode, the negative electrode, and the solid electrolyte layer constituting the solid electrolyte secondary battery will now be described in detail.

1) Positive Electrode

A positive electrode comprises a current collector, and a positive electrode layer formed on at least one surface of the current collector and containing active material particles and first and the second solid electrolyte particles. The first solid electrolyte particles are located the vicinity of a surface of the active material particles. The second solid electrolyte particles are located a gap between the active material particles. A particle size ratio of a second solid electrolyte particle size D2 to a first solid electrolyte particle size D1 (D2/D1) satisfies the relation of 3<D2/D1<50, where D1 denotes the particle size of the first solid electrolyte particles, and D2 denotes the particle size of the second solid electrolyte particles.

As the current collector, aluminum foil or aluminum alloy foil containing at least one element selected from a group consisting of Mg, Ti, Zn, Mn, Fe, Cu, and Si can be used.

A variety of oxides can be used as the active material.

Examples of the oxide include a lithium cobalt composite oxide (such as $Li_xCoO_2$), a lithium nickel composite oxide (such as $Li_xNiO_2$), a lithium nickel cobalt composite oxide (such as $LiNi_{1-y}Co_yO_2$), a lithium manganese cobalt composite oxide (such as $Li_xMn_yCo_{1-y}O_2$), a lithium nickel cobalt manganese composite oxide (such as $LiNi_{1-y-z}Co_yMn_zO_2$), a lithium nickel cobalt aluminum composite oxide (such as $LiNi_{1-y-z}Co_yAl_zO_2$), a lithium manganese composite oxide having a spinel structure (such as $Li_xMn_2O_4$), a lithium manganese nickel composite oxide having a spinel structure (such as $Li_xMn_{2-y}Ni_yO_4$), a lithium phosphorus oxide having an olivine structure (such as $Li_xFePO_4$, $Li_xFe_{1-y}Mn_yPO_4$, and $Li_xCoPO_4$), and a vanadium oxide (such as $V_2O_5$). The variables x, y, and z are preferably satisfy the following relations: $0<x\leq1$, $0\leq y\leq1$, $0\leq z\leq1$.

The active material can use the above-described compounds either in a single form or in a mixture form.

It is preferable that the active material has a high positive electrode voltage. Examples of such an active material include a lithium manganese composite oxide ($Li_xMn_2O_4$), a lithium manganese nickel composite oxide having a spinel structure ($Li_xMn_{2-y}Ni_yO_4$), a lithium nickel composite oxide ($Li_xNiO_2$), a lithium cobalt composite oxide ($Li_xCoO_2$), a lithium nickel cobalt composite oxide ($LiNi_{1-y}Co_yO_2$), a lithium manganese cobalt composite oxide ($Li_xMn_yCo_{1-y}O_2$), a lithium nickel cobalt manganese composite oxide (such as $LiNi_{1-y-z}Co_yMn_zO_2$), and lithium iron phosphate ($Li_xFePO_4$). The variables x, y, and z are preferably satisfy the following relations: $0<x\le1$, $0\le y\le1$, $0\le z\le1$.

The active material particles preferably have a particle size of 0.1 μm or more and 10 μm or less.

Examples of the first and second solid electrolytes include a solid oxide electrolyte and a solid sulfide electrolyte.

Examples of the solid oxide electrolyte include a lithium-ion conductive oxide having a Perovskite-type structure expressed by the formula $Li_{3x}La_{2/3-x}TiO_3$, where x is $0<x<2/3$, and a lithium-ion conductive oxide having a Garnet-type structure expressed by the formula $Li_{5+x}La_3M_{2-x}Zr_xO_{12}$, where M is at least one selected from Nb and Ta, and x is Other examples of the lithium-ion conductive oxide include oxides referred to as LISICON, LIPON, and NASICON. Of lithium-ion conductive oxides having a Perovskite-type structure, $Li_{0.35}La_{0.55}TiO_3$ is particularly preferable because of the high ion conductivity. Of Garnet-type oxides, $Li_5La_3Nb_2O_{12}$, $Li_5La_3Ta_2O_{12}$, and $Li_7La_3Zr_2O_{12}$ are preferable. Of oxides referred to as LISICON, $Li_{14}ZnGe_4O_{16}$ is preferable. Of oxides referred to as NASICON, $Li_{1+x}Al_xTi_{2-x}(PO_4)_3$ and $Li_{1+x}Al_xGe_{2-x}(PO_4)_3$, where x is $0<x\le0.5$, are preferable. In particular, $Li_{1.5}Al_{0.5}Ge_{1.5}(PO_4)_3$ is preferable because of high ion conductivity and high reduction resistance.

The lithium-ion conductive oxide increases lithium ion conductivity between the positive electrode layer and the solid electrolyte layer.

Examples of the solid sulfide electrolyte include a compound expressed by $(1-x-y)Li_2S.xGeS_2.yP_2S_{50}$, where x and y are $0\le x<0.5$, $0\le y<0.4$, respectively, sulfides referred to as THIO-LISICON and sulfide glass ceramic, and compounds expressed by $(1-x)Li_2S-xB_2S_3$ and $(1-x)Li_2S-xGeS_2$, where x is $0.15\le x<0.5$. Of THIO-LISICON, $Li_{4-x}Ge_{1-x}P_xS_4$, where x is $0.2<x\le0.9$, is preferable. Of sulfide glass ceramic, $(1-x)Li_2S.xP_2S_{50}$, where x is $0.15\le x<0.5$, is preferable. Of the above-mentioned lithium-ion conductive sulfides, sulfides referred to as THIO-LISICON and sulfide glass-ceramic are more preferable.

The shape of the first and second solid electrolyte particles is not limited, and includes irregular-shaped particles, spherical particles, plate-shaped particles, bar-shaped particles, needle-shaped particles, and the like. Further, the first and second solid electrolyte particles may contain a plurality of shapes of solid electrolyte particles.

More preferably, the particle size ratio of the second solid electrolyte particle size D2 to the first solid electrolyte particle size D1 (D2/D1) satisfies the relation of $8\le D2/D1\le20$, where D1 denotes the particle size of the first solid electrolyte particles and D2 denotes the particle size of the second solid electrolyte particles.

The first and second solid electrolyte particles preferably have a particle size of 0.05 μm or more and 0.5 μm or less, for example.

The first solid electrolyte particles and the second solid electrolyte particles are preferably formulated in ratios of 10 to 40% by volume of the first solid electrolyte particles and 5 to 25% by volume of the second solid electrolyte particles.

More preferably, the first solid electrolyte particles and the second solid electrolyte particles are formulated in ratios of 15 to 25% by volume of the first solid electrolyte particles and 8 to 15% by volume of the second solid electrolyte particles.

The positive electrode layer may contain a conductive agent and a binder, as well as the active material particles and the first and second solid electrolyte particles.

The conductive agent increases the current collection properties, and reduces the contact resistance between the active material and the current collector. Examples of the conductive agent include carbonaceous matters, such as acetylene black, carbon black, graphite, carbon nano fiber, and carbon nanotube.

The binder improves binding between the active material and the conductive agent with the current collector. Examples of the binder include lithium-ion conductive polymers such as polytetrafluoroethylene (PTFE), a polyvinylidene fluoride, a fluorine-based rubber, and a polyethylene oxide containing lithium salt.

The incorporation ratio of the active material particles, the first and second solid electrolyte particles, the conductive agent, and the binder in the positive electrode layer is preferably adjusted to 50% by mass or more and 95% by mass or less of the active material particles, 10% by mass or more and 30% by mass or less of the first and second solid electrolyte particles, 2% by mass or more and 30% by mass or less of the conductive agent, and 2% by mass or more and 20% by mass or less of the binder.

The first and second solid electrolyte particles can improve lithium ion conductivity in the positive electrode layer at an amount of 10% by mass or more. The first and second solid electrolyte particles can achieve high energy density and high lithium ion conductivity at an amount of 30% by mass or less.

The conductive agent exhibits the above-described effect at an amount of 2% by mass or more. The conductive agent achieves both high energy density and high conductivity at an amount of 30% by mass or less.

The binder achieves sufficient negative electrode intensity at an amount of 2% by mass or more. The binder reduces the content of the binder as an insulating material in the positive electrode at an amount of 20% by mass or less, thereby educing the inner resistance.

A positive electrode can be produced using a technique that will be described below, for example. Slurry is prepared by suspending active material particles, first and second solid electrolyte particles, a conductive agent, and a binder in a solvent. The slurry is applied on at least one surface of a current collector and allowed to dry, thereby forming a positive electrode layer. The obtained negative electrode layer is pressed. It is also possible to produce a positive electrode by molding active material particles, first and second solid electrolyte particles, a conductive agent, and a binder in a pellet form so as to form a positive electrode layer, and forming the positive electrode layer on at least one surface of a current collector.

When a negative electrode layer of a negative electrode containing active material particles and first and second solid electrolyte particles in a predetermined arrangement relationship, and having a particle size ratio between the solid electrolyte particles, which will be described later, is used, a positive electrode layer of a positive electrode may be configured to contain usual active material particles. In this case, the positive electrode layer may contain a conductive agent, a binder, and a solid electrolyte as well as the active material particles.

2) Negative Electrode

A negative electrode comprises a current collector and a negative electrode layer formed on at least one surface of the current collector and containing active material particles and first and second solid electrolyte particles.

As the current collector, aluminum foil or aluminum alloy foil containing at least one element selected from a group consisting of Mg, Ti, Zn, Mn, Fe, Cu, and Si can be used.

Examples of the active material include a metal sulfide, a metal oxide, carbon, and an alloy.

Examples of the metal sulfide include a titanium sulfide, and an iron sulfide. A preferable metal sulfide is an iron sulfide.

Examples of the metal oxide include a titanium composite oxide, a niobium composite oxide, a silicon composite oxide, and an iron oxide. The metal oxide is preferably a titanium composite oxide, and more preferably a spinel-type lithium titanate.

Examples of the carbon include graphite and hard carbon. The alloy is preferably an alloy of Li and at least one metal selected from a group consisting of Si, Al, Sn, and In.

Examples of the first and second solid electrolytes include a solid oxide electrolyte and a solid sulfide electrolyte as described with reference to the positive electrode.

The shape of the first and second solid electrolyte particles is not limited, and includes irregular-shaped particles, spherical particles, plate-shaped particles, bar-shaped particles, needle-shaped particles, and the like. Further, the first and second solid electrolyte particles may contain a plurality of shapes of solid electrolyte particles.

A particle size ratio of a second solid electrolyte particle size D2 to a first solid electrolyte particle size D1 (D2/D1) preferably satisfy the relation of $8 \leq D2/D1 \leq 20$, where D1 denotes the particle size of the first solid electrolyte particles, and D2 denotes the particle size of the second solid electrolyte particles.

The first and second solid electrolyte particles preferably have a particle size of 0.05 µm or more and 0.5 µm or less, for example.

The first solid electrolyte particles and the second solid electrolyte particles are preferably formulated in ratios of 10 to 40% by volume of the first solid electrolyte particles and 5 to 25% by volume of the second solid electrolyte particles. More preferably, the first solid electrolyte particles and the second solid electrolyte particles are formulated in ratios of 15 to 25% by volume of the first solid electrolyte particles and 8 to 15% by volume of the second solid electrolyte particles.

The negative electrode layer may contain a conductive agent and a binder, as well as the active material particles and the first and second solid electrolyte particles.

The conductive agent increases the current collection properties, and reduces the contact resistance between the active material and the current collector. Examples of the conductive agent include carbonaceous matters, such as acetylene black, carbon black, graphite, carbon nano fiber, and carbon nanotube.

The binder improves binding between the active material and the conductive agent with the current collector. Examples of the binder include lithium-ion conductive polymers such as polytetrafluoroethylene (PTFE), a polyvinylidene fluoride, a fluorine-based rubber, and a polyethylene oxide containing lithium salt.

The incorporation ratio of the active material particles, the first and second solid electrolyte particles, the conductive agent, and the binder in the negative electrode layer is preferably adjusted to 50% by mass or more and 96% by mass or more of the active material particles, 10% by mass or more and 30% by mass or less of the first and second solid electrolyte particles, 2% by mass or more and 30% by mass or less of the conductive agent, and 2% by mass or more and 30% by mass or less of the binder.

When the conductive agent is contained in an amount of less than 2% by mass, the current collection properties of the negative electrode layer deteriorate, which may cause deterioration in large-current characteristics of the solid electrolyte battery. When the binder is contained in an amount of less than 2% by mass, the binding properties between the negative electrode layer and the current collector deteriorate, which may cause deterioration in cycle characteristics. From the viewpoint of achieving high capacitance, on the other hand, each of the first and second solid electrolyte particles, the conductive agent, and the binder are preferably contained in an amount of 30% by mass or less.

The negative electrode can be produced using a technique that will be described below, for example. Slurry is prepared by suspending active material particles, first and second solid electrolyte particles, a conductive agent, and a binder in a solvent. The slurry is applied onto at least one surface of a current collector and allowed to dry, and thereby a negative electrode layer is formed. The obtained negative electrode layer is pressed. It is also possible to produce a negative electrode by molding active material particles, first and second solid electrolyte particles, a conductive agent, and a binder in a pellet form so as to form a negative electrode layer, and forming the negative electrode layer on at least one surface of a current collector.

When the above-described positive electrode containing the active material particles and first and second solid electrolyte particles in a predetermined arrangement relationship and having a particle size ratio between the solid electrolyte particles, which will be described later, is used, the negative electrode layer of the negative electrode may be configured to contain usual active material particles. In this case, the negative electrode layer may contain a conductive agent, a binder, and a solid electrolyte, as well as the active material particles.

3) Solid Electrolyte Layer

Examples of the solid electrolyte include a solid oxide electrolyte and a solid sulfide electrolyte.

Examples of the solid oxide electrolyte include a lithium-ion conductive oxide having a Perovskite-type structure expressed by the formula $Li_{3x}La_{2/3-x}TiO_3$, where x is $0<x<2/3$, and a lithium-ion conductive oxide having a Garnet-type structure expressed by the formula $Li_{5+x}La_3M_{2-x}Zr_xO_{12}$, where M is at least one of Nb and Ta, and x is $0 \leq x \leq 2$. Other examples of the lithium-ion conductive oxide include oxides referred to LISICON, LIPON, and NASICON. Of lithium-ion conductive oxides having a Perovskite-type structure, $Li_{0.35}La_{0.55}TiO_3$ is particularly favorable because of high ion conductivity. Of Garnet-type oxides, $Li_5La_3Nb_2O_{12}$, $Li_5La_3Ta_2O_{12}$, and $Li_7La_3Zr_2O_{12}$ are preferable. Of oxides referred to as LISICON, $Li_{14}ZnGe_4O_{16}$ is preferable. Of oxides referred to as NASICON, $Li_{1+x}Al_xTi_{2-x}(PO_4)_3$ and $Li_{1+x}Al_xGe_{2-x}(PO_4)_3$, where x is $0<x \leq 0.5$, are preferable. In particular, $Li_{1.5}Al_{0.5}Ge_{1.5}(PO_4)_3$ is preferable because of high ion conductivity and high reduction resistance.

Examples of the solid sulfide electrolyte include a compound expressed by $(1-x-y)Li_2S.xGeS_2.yP_2S_5$, where x and y are $0 \leq x<0.5$, $0 \leq y<0.4$, sulfides referred to as THIO-LISICON and sulfide glass ceramic, and compounds expressed by $(1-x)Li_2S_{-x}B_2S_3$ and $(1-x)Li_2S-xGeS_2$, where x is $0.15 \leq x<0.5$. Of THIO-LISICON, $Li_{4-x}Ge_{1-x}P_xS_4$, where x is 0.2<x≤0.9, is preferable. Of sulfide glass ceramic, $(1-x)Li_2S \cdot xP_2S_5$, where x is 0.15≤x<0.5, is preferable. Of the above-mentioned lithium-ion conductive sulfides, sulfides referred to as THIO-LISICON and sulfide glass-ceramic are more preferable.

A solid electrolyte layer can be produced by an application technique on a positive electrode layer or a negative electrode layer. For example, a solid electrolyte layer can be produced on a positive electrode layer described below. That is, preparing slurry by dispersing a solid electrolyte and the binder in a solvent, and applying the slurry on a positive electrode layer and then allowing the slurry to dry.

Figure 1:
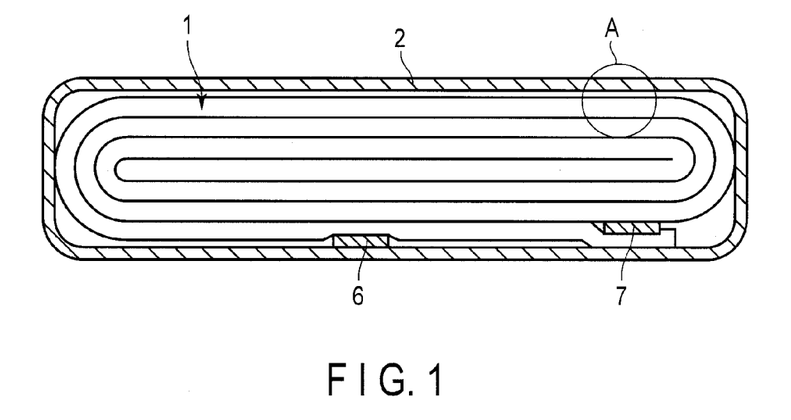
FIG. 1 is a cross-sectional view of a flat-shaped solid electrolyte secondary battery according to an embodiment.
Figure 2:
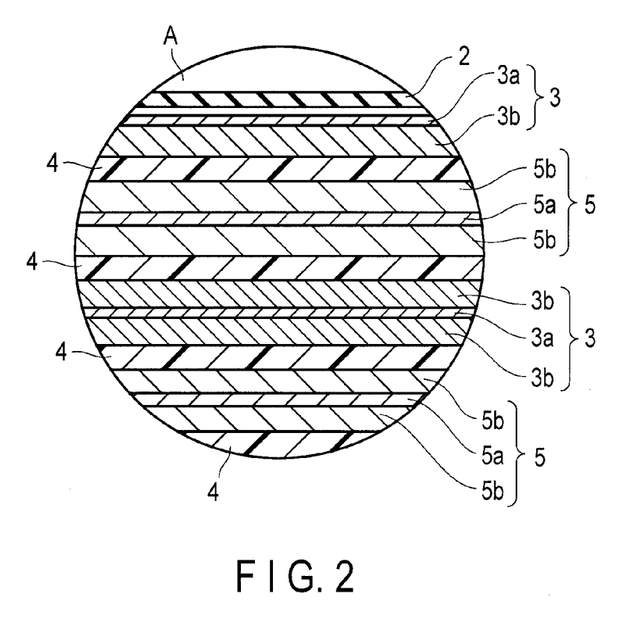
FIG. 2 is an enlarged cross-sectional view of part A of FIG. 1.

Next, the solid electrolyte secondary battery according to the embodiment will be described in more detail with reference to FIGS. 1 and 2. FIG. 1 is a cross-sectional view of the flat-shaped solid electrolyte secondary battery according to the embodiment, and FIG. 2 is an enlarged cross-sectional view of part A of FIG. 1. Since the drawings are schematic views for illustrating the invention and promoting understanding thereof, shapes, dimensions, ratios, and the like shown in the drawings may be different from those of the actual devices, and may be designed and changed as appropriate in consideration of the description that will be given below and publicly-known techniques.

A flat-shaped wound electrode group 1 is contained in a sac-like exterior container 2 formed of a laminated film in which a metal layer is interposed between two resin films. The flat-shaped wound electrode group 1 is formed by winding a stacked object obtained by stacking a negative electrode 3, a solid electrolyte layer 4, a positive electrode 5, and a solid electrolyte layer 4 in this order in a spiral manner from the outside, and press-molding the stacked object.

The negative electrode 3 at the outermost surface has a structure in which a negative electrode layer 3b, containing active material particles, first solid electrolyte particles located the vicinity of a surface of the active material particles, and second solid electrolyte particles located a gap between the active material particles, is formed on one surface of an inner surface side of a current collector 3a, as shown in FIG. 2. A particle size ratio of a second solid electrolyte particle size D2 to a first solid electrolyte particle size D1 (D2/D1) satisfies the relation of 3<D2/D1<50, where D1 denotes the particle size of the first solid electrolyte particles, and D2 denotes the particle size of the second solid electrolyte particles. The other negative electrode 3 is configured by forming a negative electrode layer 3b on both surfaces of the current collector 3a. The negative electrode layer 3b may contain a conductive agent and a binder, as well as the active material and the first and second solid electrolyte particles.

The positive electrode 5 is configured by forming a positive electrode layer 5b on both surfaces of the current collector 5a. When the active material particles and the first and second solid electrolyte particles have a predetermined arrangement relationship in the negative electrode layer 3b, the positive electrode layer 5b contains at least active material particles. When the negative electrode layer 3b contains at least the active material particles, the positive electrode layer 5b contains active material particles, first solid electrolyte particles existing in the vicinity of a surface of the active material particles, and second solid electrolyte particles existing in a gap between the active material particles. A particle size ratio of a second solid electrolyte particle size D2 to a first solid electrolyte particle size D1 (D2/D1) satisfies the relation of 3<D2/D1<50, where D1 denotes the particle size of the first solid electrolyte particles, and D2 denotes the particle size of the second solid electrolyte particles. The positive electrode layer 5b may contain a conductive agent and a binder, as well as the active material particles and the first and second solid electrolyte particles.

The solid electrolyte layer 4 is interposed between the negative electrode layer 3b of the negative electrode 3 and the positive electrode layer 5b of the positive electrode 5.

In the vicinity of a circumferential edge of the wound electrode group 1, a negative electrode terminal 6 is connected to the current collector 3a of the negative electrode 3 at the outermost shell, and a positive electrode terminal 7 is connected to the current collector 5a of the inner positive electrode 5. The negative electrode terminal 6 and the positive electrode terminal 7 extend toward the outside from an opening of a sac-like exterior container 2. By heat-sealing the opening of the sac-like exterior container 2 by interposing the negative electrode terminal 6 and the positive electrode terminal 7 in between, the wound electrode group 1 is completely sealed in the exterior container 2.

The negative electrode terminal can be formed of a material having a potential of equal to or greater than 0.4 V vs. lithium metal and equal to or less than 3 V vs. lithium metal, and having electrical safety and high conductivity. More specifically, the negative electrode terminal can be formed of an aluminum alloy containing an element such as Mg, Ti, Zn, Mn, Fe, Cu or Si, or aluminum. In order to reduce the contact resistance, the negative electrode terminal should preferably be formed of a material similar to that of the current collector.

The positive electrode terminal can be formed of a material having a potential of equal to or greater than 3 V and equal to or less than 5 V against lithium metal, and having electrical safety and conductivity. More specifically, the positive electrode terminal can be formed of an aluminum alloy containing an element such as Mg, Ti, Zn, Mn, Fe, Cu, or Si, or aluminum. In order to reduce the contact resistance, the positive electrode terminal should preferably be formed of a material similar to that of the current collector.

A flat-shaped solid electrolyte secondary battery has been described as an example of the solid electrolyte secondary battery according to the embodiment. The shape of the battery, however, is not limited to the flat shape and may be a square shape, a cylindrical shape, a coin shape, a button shape, a sheet shape, or a stacked shape. Further, the solid electrolyte secondary battery may be a large-scale battery mounted on a two-wheel or four-wheel vehicle, for example, as well as a small-scale battery mounted on a portable electronic device or the like.

The above-described solid electrolyte secondary battery, in which at least one of the positive electrode and the negative electrode contains active material particles, first solid electrolyte particles located the vicinity of a surface of the active material particles, and second solid electrolyte particles located a gap between the active material particles, and a particle size ratio of a second solid electrolyte particle size D2 to a first solid electrolyte particle size D1 (D2/D1) satisfies the relation of 3<D2/D1<50, where D1 denotes the particle size of the first solid electrolyte particles, and D2 denotes the particle size of the second solid electrolyte particles, achieves improvement in input/output characteristics against a large current.

Next, a battery pack according to the embodiment will be described in detail below.

In general, the battery pack according to the embodiment comprises one or more solid electrolyte secondary battery (unit cell). When plurality of unit cells include, the unit cells are electrically connected in series, in parallel, or in series and in parallel.

The above battery pack according to this embodiment will be explained in detail with reference to FIGS. 3 and 4. The solid electrolyte secondary battery shown in FIG. 1 is used as the unit cell.

Plural unit cells 21 are laminated such that the externally extended negative electrode terminal 6 and positive electrode terminal 7 are arranged in the same direction and fastened with an adhesive tape 22 to thereby constitute a battery assembly 23. These unit cells 21 are electrically connected each other in series as shown in FIG. 4.

A print wiring board 24 is disposed opposite to the side surface of the unit cell 21 from which the negative electrode terminal 6 and positive electrode terminal 7 extend. As shown in FIG. 4, a thermistor 25, a protective circuit 26 and an energizing terminal 27 connected to external devices are mounted on the print wiring board 24. An insulating plate (not shown) is attached to the surface of the print wiring substrate 24 facing the battery assembly 23 to avoid unnecessary connection with the wiring of the battery assembly 23.

One of the ends of the positive electrode side lead 28 is connected with the positive electrode terminal 7 positioned on the lowermost layer of the battery assembly 23 and the other end is inserted into a positive electrode side connector 29 of the print wiring board 24 to be electrically connected with the print wiring board 24. One of the ends of the negative electrode side lead 30 is connected with the negative electrode terminal 6 positioned on the uppermost layer of the battery assembly 23 and the other end is inserted into a negative electrode side connector 31 of the print wiring board 24 to be electrically connected with the print wiring board 24. These connectors 29 and 31 are connected to the protective circuit 26 through wirings 32 and 33 formed on the print wiring board 24.

The thermistor 25 is used to detect the temperature of the unit cell 21 and the detection signals are transmitted to the protective circuit 26. The protective circuit 26 can shut off a plus side wiring 34a and minus side wiring 34b between the protective circuit 26 and the energizing terminal 27 connected to external devices under a predetermined condition. The predetermined condition means, for example, the case where the temperature detected by the thermistor 25 is above a predetermined one. Also, the predetermined condition means, for example, the case of detecting overcharge, overdischarge and over-current of the unit cell 21. The detection of this overcharge and the like is made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 3 and 4, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery assembly 23 other than the side surface from which the positive electrode terminal 7 and negative electrode terminal 6 are projected.

The battery assembly 23 is housed in a housing tank 37 together with each protective sheet 36 and print wiring board 24. Specifically, the protective sheet 36 is disposed on each inside surface in the direction of the long side and on one of the inside surfaces in the direction of the short side of the receiving tank 37, and the print wiring board 24 is disposed on the other inside surface in the direction of the short side. The battery assembly 23 is positioned in a space enclosed by the protective sheets 36 and the print wiring board 24. A lid 38 is attached to the upper surface of the receiving tank 37.

Here, a thermally contracting tape may be used in place of the adhesive tape 22 to secure the battery assembly 23. In this case, after the protective sheet is disposed on both sides of the battery assembly and the thermally contracting tapes are wound around the battery assembly, the thermally contracting tape is contracted by heating to fasten the battery assembly.

Figure 3:
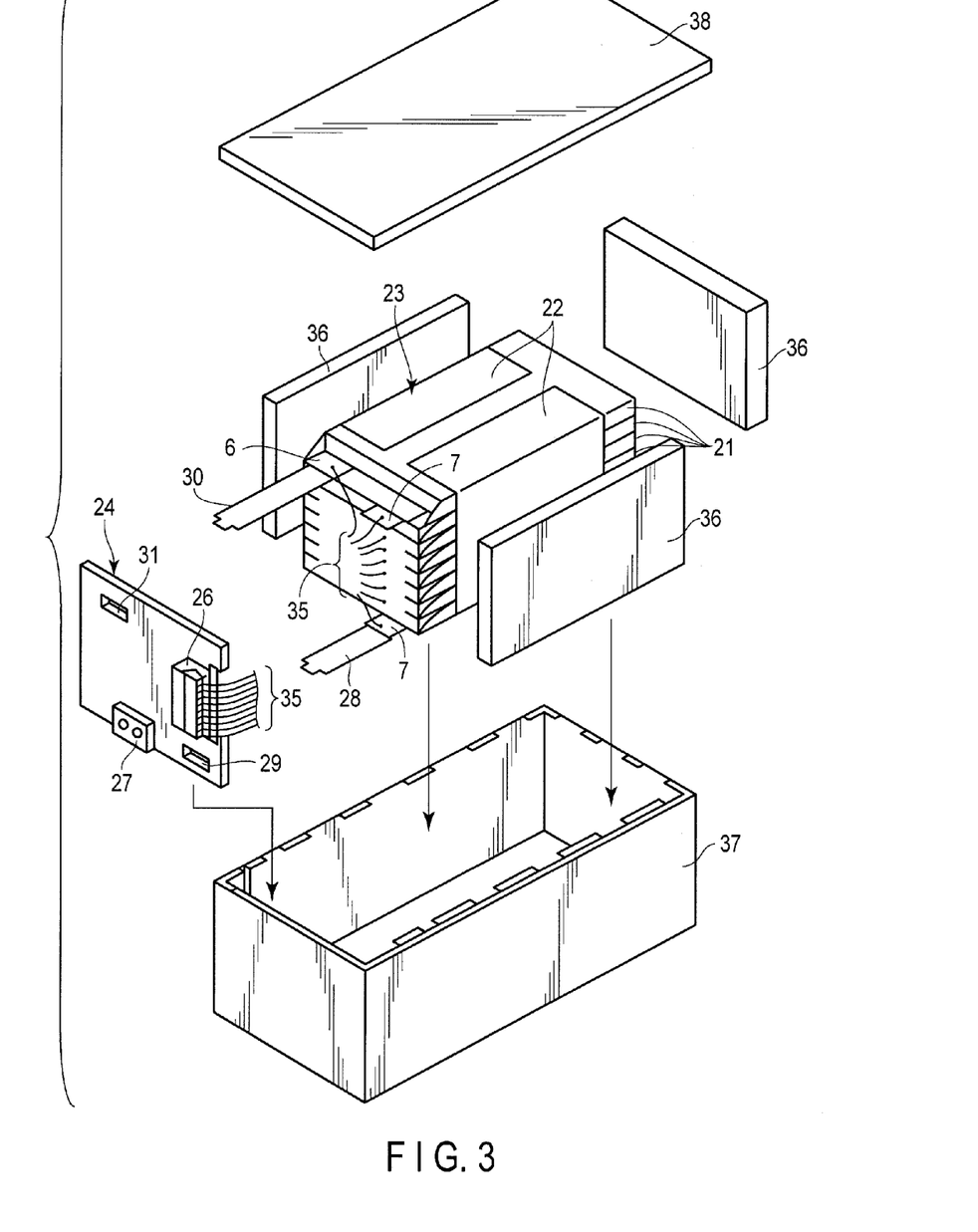
FIG. 3 is an exploded perspective view of a battery pack according to the embodiment.
Figure 4:
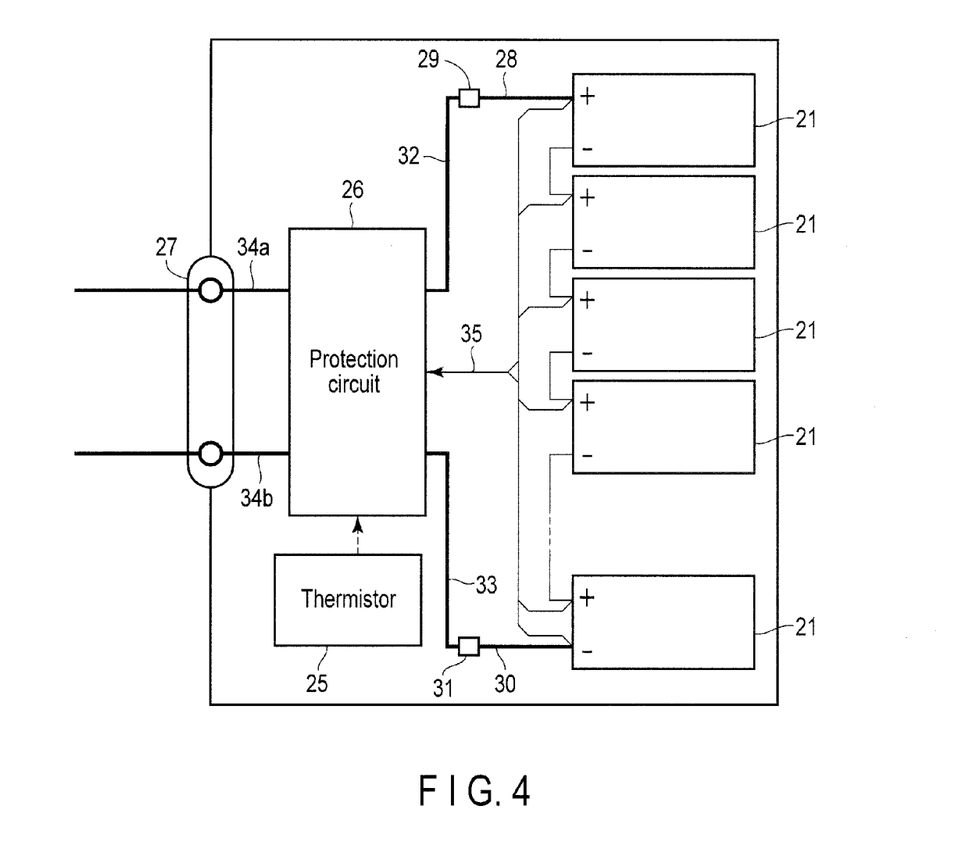
FIG. 4 is a block diagram illustrating an electric circuit of the battery pack of FIG. 3.

The structure in which the unit cells 21 are connected in series is shown in FIGS. 3 and 4. However, with regard to these unit cells 21, either parallel or series-parallel cell connections may be used to increase the capacity of the battery. The assembled battery packs may be further connected in series or parallel.

Also, the structure of the battery pack is appropriately changed according to its use. The battery pack is preferably used in applications exhibiting excellent cycle characteristics when a large current is extracted. Examples of these applications include power sources for digital cameras, and power sources mounted on vehicles such as two- to four-wheel hybrid electric cars, two- to four-wheel electric cars and assist bicycles. The battery pack is preferably used for power sources mounted on vehicles.

EXAMPLES

Descriptions will be given on examples, but the present invention should only fall within the scope of the invention and is not limited to the examples that will be described herein.

Example 1

$LiCoO_2$ particles, acetylene black, polyvinylidene fluoride, and $Li_5La_3Ta_2O_{12}$ particles were mixed in an N-methyl-2-pyrrolidone solvent at a weight ratio of 50:15:10:25, thereby preparing slurry. The $LiCoO_2$ particles had an average particle size of 1 μm. The $Li_5La_3Ta_2O_{12}$ particles had peak particle size distributions at 0.1 μm and 2 μm. The obtained slurry was applied to Al foil, and was allowed to dry. The dried slurry was subjected to hot pressing, thereby producing a positive electrode in which a positive electrode layer having a thickness of 40 μm and a density of 3.0 g/cm$^3$ was provided on the Al foil.

Example 2

$Li_4Ti_5O_{12}$ particles, acetylene black, polyvinylidene fluoride, and $Li_5La_3Ta_2O_{12}$ particles were mixed in an N-methyl-2-pyrrolidone solvent at a weight ratio of 60:10:10:20, thereby preparing slurry. The $Li_4Ti_5O_{12}$ particles had an average particle size of 1 μm. The $Li_5La_3Ta_2O_{12}$ particles had peak particle size distributions at 0.1 μm and 2 μm. The obtained slurry was applied to Al foil, and was allowed to dry. The dried slurry was subjected to hot pressing, thereby producing a positive electrode in which a positive electrode layer having a thickness of 36 μm and a density of 2.4 g/cm$^3$ was provided on the Al foil.

Comparative Example 1

A positive electrode was produced in same procedure of Example 1, except that $Li_5La_3Ta_2O_{12}$ particles had a peak particle size distribution at 2 μm.

Comparative Example 2

A negative electrode was produced in same procedure of Example 2, except that $Li_5La_3Ta_2O_{12}$ particles had a peak particle size distribution at 2 μm.

Comparative Example 3

A negative electrode was produced in same procedure of Example 2, except that $Li_5La_3Ta_2O_{12}$ particles had peak particle size distributions at 3 μm and 6 μm.

Comparative Example 4

A negative electrode was produced in same procedure of Example 2, except that $Li_5La_3Ta_2O_{12}$ particles had peak particle size distributions at 0.5 μm and 29 μm.

In the positive electrode layer of the obtained positive electrode of each of Example 1 and Comparative Example 1, a particle size D1 of first $Li_5La_3Ta_2O_{12}$ particles located the vicinity of a surface of the $LiCoO_2$ particles and a particle size D2 of second $Li_5La_3Ta_2O_{12}$ particles located a gap between the $LiCoO_2$ particles were measured using a SEM. Ten of the solid electrolyte particles located the vicinity of the active material were randomly selected, and an arithmetical mean of the particle sizes was defined as D1. Ten of the solid electrolyte particles located a gap between the active material particles were randomly selected, and an arithmetic mean of the particle sizes was defined as D2. A value of the long axis of the particle was used as the particle size. The expression "vicinity of the active material" refers to a state in which the solid electrolyte particles are in contact with one active material in measurement using a SEM. The expression "gap between the active material particles" refers to a state in which the solid electrolyte particles are not in contact with an active material or in contact with a plurality of active materials in measurement using a SEM (Scanning Electron Microscope).

In the negative electrode layer of the obtained negative electrode of each of Example 2 and Comparative Examples 2-4, a first solid electrolyte particle size D1 of the first $Li_5La_3Ta_2O_{12}$ particles located the vicinity of a surface of the $Li_4Ti_5O_{12}$ particles and a second solid electrolyte particle size D2 of the second $Li_5La_3Ta_2O_{12}$ particles located a gap between the $Li_4Ti_5O_{12}$ particles were measured using a SEM.

Based on the particle sizes D1 and D2, a particle size ratio of the second solid electrolyte particle size D2 to the first solid electrolyte particle size D1 (D2/D1) was determined as 3<D2/D1<50 in Examples 1 and 2. In Comparative Examples 1 and 2, on the other hand, since the number of the particle size distribution peaks is one, D2/D1 was determined as 1. D2/D1 was determined as 1.8 in Comparative Example 3, and D2/D1 was determined as 60 in Comparative Example 4.

A charge/discharge test was performed on the electrode (positive electrode or negative electrode) of each of Examples 1 and 2 and Comparative Examples 1-4 under the environment of 45° C. For evaluation of the electrode, a two-electrode cell which uses lithium metal as the opposite electrode was used. In order to improve contact between the electrode and the lithium metal, a polymer electrolyte layer was interposed between the electrode and the lithium metal. The polymer electrolyte layer was produced with reference to S. Kuwabata et al, J. Electrochem. Soc., 149 (2002), A988.

The charge/discharge conditions will be described below. In Example 1 and Comparative Example 1, charging was performed to 4.2 V vs. $Li/Li^+$ at a rated current of 0.1 C rate, and then rated voltage charging was performed at 4.2 V vs. $Li/Li^+$. The charging time was 15 hours. In discharging, measurement was performed by varying the current rate. Discharging was performed to 3.5 V vs. $Li/Li^+$ at rated currents of 0.1 C rate and 0.5 C rate.

In Example 2 and Comparative Examples 2-4, charging was performed to 1.2 V vs. $Li/Li^+$ at a rated current of 0.1 C rate, and then rated voltage charging was performed at 1.2 V vs. $Li/Li^+$. The charging time was 15 hours. In discharging, measurement was performed by varying the current rate. Discharging was performed to 3.0 V vs. $Li/Li^+$ at rated currents of 0.1 C rate and 0.5 C rate.

In the above-described charge/discharge test, a ratio of a discharge capacitance at 0.5 C to a discharge capacitance at 0.1 C [(0.5 C discharge capacitance/0.1 C discharge capacitance)×100(%)]] was determined. The results are shown in Table 1.

TABLE 1

|  | (0.5 C discharge capacitance/0.1 C discharge capacitance) × 100 (%) |
|---|---|
| Example 1 | 76 |
| Example 2 | 82 |
| Comparative Example 1 | 65 |
| Comparative Example 2 | 69 |
| Comparative Example 3 | 59 |
| Comparative Example 4 | 41 |

As clear from Table 1, in Examples 1 and 2 comprising a positive electrode including a positive electrode layer or a negative electrode including a negative electrode layer in which a particle size ratio (D2/D1) indicating an arrangement relationship between the active material particles and the first and second solid electrolyte particles (in particle sizes D1 and D2) satisfied the relation of 3<D2/D1<50, the ratio of the discharge capacitance at 0.5 C to the discharge capacitance at 0.1 C is high, compared to Comparative Examples 1-4 having a particle size ratio out of the above-described range.

Example 3

Production of Solid Electrolyte Layer $Li_5La_3Ta_2O_{12}$ particles and polyvinylpyrrolidone were mixed in an N-methyl-2-pyrrolidone solvent at a weight ratio of 98:2, thereby preparing slurry. The obtained slurry was applied to a positive electrode layer of a positive electrode similar to that of Example 1, and was allowed to dry. The dried slurry was subjected to hot pressing, and thereby forming a solid electrolyte layer. The thickness of the solid electrolyte layer was adjusted to be 25 μm.

After that, a negative electrode similar to that of Example 2 was stacked on the solid electrolyte layer formed in the positive electrode such that a negative electrode layer of the negative electrode was opposite to the solid electrode layer, and hot pressing was performed, thereby producing an electrode group. In this case, an area of the positive electrode and the solid electrolyte layer was made greater than an area of the negative electrode. The obtained electrode group was contained in a pack (exterior container) having a three-layer structure of a nylon layer, an aluminum layer, and a polyethylene layer and formed of a laminated film having a thickness of 0.1 mm, and was subjected to vacuum drying at 80° C. for the duration of 24 hours. After that, the pack was completely sealed with a heat seal, thereby producing a solid electrolyte secondary battery.

Example 4

Production of Positive Electrode $LiCoO_2$ particles, acetylene black, polyvinylidene fluoride, and $Li_5La_3Ta_2O_{12}$ particles were mixed in an N-methyl-2-pyrrolidone solvent at a weight ratio of 50:15:10:25, thereby preparing slurry. The $LiCoO_2$ particles had an average particle size of 1 μm. The $Li_5La_3Ta_2O_{12}$ particles had particle size distribution peaks at 0.1 μm and 4 μm. The obtained slurry was applied to Al foil, and was allowed to dry. The dried slurry was subjected to hot pressing, thereby producing a positive electrode in which a positive electrode layer having a thickness of 40 μm and a density of 3.0 g/cm³ was formed on the Al foil.

As a result of measurement of a particle size D1 of the first $Li_5La_3Ta_2O_{12}$ particles located the vicinity of a surface of the $LiCoO_2$ particles and a particle size D2 of the second $Li_5La_3Ta_2O_{12}$ particles located a gap between the $Li_4Ti_5O_{12}$ particles of the obtained negative electrode using a SEM, it was confirmed that a particle size ratio of the second solid electrolyte particle size D2 to the first solid electrolyte particle size D1 (D2/D1) satisfied the relation of 3<D2/D1<50.

Production of Solid Electrolyte Layer $Li_5La_3Ta_2O_{12}$ particles and polyvinylpyrrolidone were mixed in an N-methyl-2-pyrrolidone solvent at a weight ratio of 98:2, and thereby preparing slurry. The obtained slurry was applied onto a positive electrode layer of the positive electrode, and was allowed to dry. The dried slurry was subjected to hot pressing, thereby forming a solid electrolyte layer. A thickness of the solid electrolyte layer was adjusted to be 25 μm.

After that, a negative electrode similar to that of Example 2 was stacked on the solid electrolyte layer formed in the positive electrode such that a negative electrode layer of the negative electrode was opposite to the solid electrode layer, and hot pressing was performed, thereby producing an electrode group. In this case, an area of the positive electrode and the solid electrolyte layer was made greater than an area of the negative electrode. The obtained electrode group was contained in a pack (exterior container) having a three-layer structure of a nylon layer, an aluminum layer, and a polyethylene layer and formed of a laminated film having a thickness of 0.1 mm, and was subjected to vacuum drying at 80° C. for the duration of 24 hours. After that, the pack was completely sealed with a heat seal, and thereby producing a solid electrolyte secondary battery.

Example 5

Production of Positive Electrode $LiCoO_2$ particles, acetylene black, polyvinylidene fluoride, and $Li_5La_3Ta_2O_{12}$ particles were mixed in an N-methyl-2-pyrrolidone solvent at a weight ratio of 50:15:10:25, thereby preparing slurry. The $LiCoO_2$ particles had an average particle size of 1 μm. The $Li_5La_3Ta_2O_{12}$ particles had particle size distribution peaks at 0.3 μm and 1 μm. The obtained slurry was applied to Al foil, and was allowed to dry. The dried slurry was subjected to hot pressing, thereby producing a positive electrode in which a positive electrode layer having a thickness of 40 μm and a density of 3.0 g/cm³ was provided on Al foil.

As a result of measurement of a first solid electrolyte particle size D1 of the first $Li_5La_3Ta_2O_{12}$ particles located the vicinity of a surface of the $LiCoO_2$ particles and a second solid electrolyte particle size D2 of the second $Li_5La_3Ta_2P_{12}$ particles located a gap between the $Li_4Ti_5O_{12}$ particles of the obtained negative electrode using a SEM, it was confirmed that a particle size ratio of a second solid electrolyte particle size D2 to a first solid electrolyte particle size D1 (D2/D1) satisfied the relation of 3<D2/D1<50.

Production of Solid Electrolyte Layer $Li_5La_3Ta_2O_{12}$ particles and polyvinylpyrrolidone were mixed in an N-methyl-2-pyrrolidone solvent at a weight ratio of 98:2, thereby preparing slurry. The obtained slurry was applied onto a positive electrode layer of the positive electrode, and was allowed to dry. The dried slurry was subjected to hot pressing, thereby forming a solid electrolyte layer. A thickness of the solid electrolyte layer was adjusted to be 25 μm.

After that, a negative electrode similar to that of Example 2 was stacked on the solid electrolyte layer formed in the positive electrode such that a negative electrode layer of the negative electrode was opposite to the solid electrode layer, and hot pressing was performed, thereby producing an electrode group. In this case, an area of the positive electrode and the solid electrolyte layer was made greater than an area of the negative electrode. The obtained electrode group was contained in a pack (exterior container) having a three-layer structure of a nylon layer, an aluminum layer, and a polyethylene layer and formed of a laminated film having a thickness of 0.1 mm, and was subjected to vacuum drying at 80° C. for the duration of 24 hours. After that, the pack was completely sealed with a heat seal, thereby producing a solid electrolyte secondary battery.

Comparative Example 5

A solid electrolyte secondary battery was produced in same procedure of Example 3, except that the positive electrode of Comparative Example 1 and the negative electrode of Comparative Example 2 were used.

Comparative Example 6

A solid electrolyte secondary battery was produced in same procedure of Example 3, except that the positive electrode of Comparative Example 1 and the negative electrode of Comparative Example 4 were used.

A charge/discharge test was performed on the solid electrolyte secondary battery according to Examples 3-5 and Comparative Examples 5 and 6 under the environment of 45° C. The charge/discharge conditions will be described below. Charging was performed to 2.8 V at a rated current of 0.1 C rate, and then rated voltage charging was performed at 2.8 V. The charging time was 15 hours. In discharging, measurement was performed by varying the current rate. Discharging was performed to 1.5 V at rated currents of 0.1 C rate and 0.5 C rate.

In the above-described charge/discharge test, a ratio of a discharge capacitance at 0.5 C to a discharge capacitance at 0.1 C [(0.5 C discharge capacitance/0.1 C discharge capacitance)×100(%)] was determined. The results are shown in Table 2.

TABLE 2

| | (0.5 C discharge capacitance/0.1 C discharge capacitance) × 100 (%) |
|---|---|
| Example 3 | 65 |
| Example 4 | 61 |
| Example 5 | 67 |
| Comparative Example 5 | 49 |
| Comparative Example 6 | 59 |

As clear from Table 2, in the solid electrolyte secondary battery according to Examples 3-5 comprising a positive electrode and a negative electrode in which a particle size ratio (D2/D1), indicating an arrangement relationship between the active material particles and the first and second solid electrolyte particles (particle sizes D1 and D2), satisfied the relation of 3<D2/D1<50, the ratio of the discharge capacitance at 0.5 C to the discharge capacitance at 0.1 C is high, compared to the solid electrolyte secondary batteries according to Comparative Examples 5 and 6 comprising a positive electrode and a negative electrode having a particle size ratio out of the above-described range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode for a solid electrolyte secondary battery comprising a current collector, and an electrode layer formed on at least one surface of the current collector and containing active material particles, first solid electrolyte particles located the vicinity of a surface of the active material particles, and second solid electrolyte particles located a gap between the active material particles, the first solid electrolyte particles and the second solid electrolyte particles being formulated in ratios of 10 to 40% by volume of the first solid electrolyte particles and 5 to 25% by volume of the second solid electrolyte particles, wherein a particle size ratio of a second solid electrolyte particle size D2 to a first solid electrolyte particle size D1 (D2/D1) satisfies the relation of 3<D2/D1<50, where D1 denotes the particle size of the first solid electrolyte particles having a particle size of 0.05 μm or more and 0.5 μm or less, and D2 denotes the particle size of the second solid electrolyte particles, the first solid electrolyte and the second solid electrolyte are a solid oxide electrolyte, or a solid sulfide electrolyte, the solid oxide electrolyte is at least one selected from the group consisting of a lithium-ion conductive oxide having a Perovskite-type structure expressed by the formula $Li_{3x}La_{2/3-x}TiO_3$, where x is 0<x<2/3, a lithium-ion conductive oxide having a Garnet-type structure expressed by the formula $Li_{5+x}La_3M_{2-x}Zr_xO_{12}$, where M is at least one of Nb and Ta, and x is 0≤x≤2, and a lithium-ion conductive oxide including oxides referred to LISICON, LIPON, and NASICON, and the solid sulfide electrolyte is at least one selected from the group consisting of a compound expressed by (1−x−y) $Li_2S \cdot xGeS_2 \cdot yP_2S_5$, where x and y are 0≤x<0.5, 0≤y<0.4, sulfides referred to as THIO-LISICON, sulfide glass ceramic, and compounds expressed by (1−x) $Li_2S_{-x}B_2S_3$ and (1−x)$Li_2S$-$xGeS_2$, where x is 0.15≤x<0.5.

2. The electrode of claim 1, wherein the active material particles have a particle size of 0.1 μm or more and 10 μm or less.

3. A solid electrolyte secondary battery comprising a positive electrode, a negative electrode, and a solid electrolyte layer, wherein the positive electrode comprises a current collector, and an electrode layer formed on at least one surface of the current collector and containing active material particles, first solid electrolyte particles located the vicinity of a surface of the active material particles, and second solid electrolyte particles located a gap between the active material particles, the first solid electrolyte particles and the second solid electrolyte particles being formulated in ratios of 10 to 40% by volume of the first solid electrolyte particles and 5 to 25% by volume of the second solid electrolyte particles, the negative electrode comprises a current collector, and an electrode layer formed on at least one surface of the current collector and containing active material particles, first solid electrolyte particles located the vicinity of a surface of the active material particles, and second solid electrolyte particles located a gap between the active material particles, the first solid electrolyte particles and the second solid electrolyte particles being formulated in ratios of 10 to 40% by volume of the first solid electrolyte particles and 5 to 25% by volume of the second solid electrolyte particles, a particle size ratio of a second solid electrolyte particle size D2 to a first solid electrolyte particle size D1 (D2/D1) satisfies a relation of 3<D2/D1<50, where D1 denotes a particle size of the first solid electrolyte particles having a particle size of 0.05 μM or more and 0.5 μm or less, and D2 denotes a particle size of the second solid electrolyte particles, the first solid electrolyte and the second solid electrolyte are a solid oxide electrolyte or a solid sulfide electrolyte, the solid oxide electrolyte is at least one selected from the group consisting of a lithium-ion conductive oxide having a Perovskite-type structure expressed by the formula $Li_{3x}La_{2/3-x}TiO_3$, where x is 0<x<2/3, a lithium-ion conductive oxide having a Garnet-type structure expressed by the formula $Li_{5+x}M_{2-x}Zr_xO_{12}$, where M is at least one of Nb and Ta, and x is 0≤x≤2, and a lithium-ion conductive oxide including oxides referred to LISICON, LIPON, and NASICON, and the solid sulfide electrolyte is at least one selected from the group consisting of a compound expressed by (1−x−y) $Li_2S \cdot xGeS_2 \cdot yP_2S_5$, where x and y are 0≤x<0.5, 0≤y<0.4, sulfides referred to as THIO-LISICON, sulfide glass ceramic, and compounds expressed by (1−x) $Li_2S_{-x}B_2S_3$ and (1−x)$Li_2S$-$xGeS_2$, where x is 0.15≤x<0.5.

4. A battery pack comprising the solid electrolyte secondary battery according to claim 3.

5. The electrode of claim 1, wherein LISICON is $Li_{14}ZnGe_4O_{16}$.

6. The electrode of claim 1, wherein NASICON is $Li_{1+x}Al_xTi_{2-x}(PO_4)_3$ or $Li_{1+x}Al_xGe_{2-x}(PO_4)_3$, where x is $0<x\leq0.5$.

7. The electrode of claim 1, wherein THIO-LISICON is $Li_{4-x}Ge_{1-x}P_xS_4$, where x is $0.2<x\leq0.9$.

8. The solid electrolyte secondary battery of claim 3, wherein LISICON is $Li_{14}ZnGe_4O_{16}$.

9. The solid electrolyte secondary battery of claim 3, wherein NASICON is $Li_{1+x}Al_xTi_{2-x}(PO_4)_3$ or $Li_{1+x}Al_xGe_{2-x}(PO_4)_3$, where x is $0<x\leq0.5$.

10. The solid electrolyte secondary battery of claim 3, wherein THIO-LISICON is $Li_{4-x}Ge_{1-x}P_xS_4$, where x is $0.2<x\leq0.9$.

11. The electrode of claim 1, wherein the electrode layer further comprises a conductive agent and a binder.

12. The electrode of claim 11, wherein the binder is a polytetrafluoroethylene, a polyvinylidene fluoride, a fluorine-based rubber, or a polyethylene oxide containing lithium salt.

13. The solid electrolyte secondary battery of claim 3, wherein the positive electrode layer further comprises a conductive agent and a binder, and the negative electrode layer further comprises a conductive agent and a binder.

14. The solid electrolyte secondary battery of claim 13, wherein each of the binders in the positive electrode layer and the negative electrode layer is a polytetrafluoroethylene, a polyvinylidene fluoride, a fluorine-based rubber, or a polyethylene oxide containing lithium salt.

* * * * *